US008046011B2

(12) United States Patent
Smith et al.

(10) Patent No.: US 8,046,011 B2
(45) Date of Patent: Oct. 25, 2011

(54) SYSTEM AND METHOD FOR ENABLING SHORT MESSAGE SERVICES BETWEEN WIRELESS AND WIRELINE COMMUNICATION SYSTEMS

(75) Inventors: Blaine E. Smith, Overland Park, KS (US); Rachel S. Downtain, Overland Park, KS (US); Robert J. Morrill, Overland Park, KS (US)

(73) Assignee: Embarq Holdings Company, LLC, Overland Park, KS (US)

( * ) Notice: Subject to any disclaimer, the term of this patent is extended or adjusted under 35 U.S.C. 154(b) by 669 days.

(21) Appl. No.: 11/726,810

(22) Filed: Mar. 23, 2007

(65) Prior Publication Data

US 2008/0233982 A1   Sep. 25, 2008

(51) Int. Cl.
*H04Q 7/20* (2006.01)
(52) U.S. Cl. ... 455/466; 379/219; 379/242; 379/114.27; 379/88
(58) Field of Classification Search .................. 379/219, 379/242, 114.27, 88; 455/466
See application file for complete search history.

(56) References Cited

U.S. PATENT DOCUMENTS

| 5,867,562 | A * | 2/1999 | Scherer ...................... 379/88.21 |
| 6,327,349 | B1* | 12/2001 | Rollins ..................... 379/114.27 |
| 7,076,047 | B1* | 7/2006 | Brennan et al. ............... 379/219 |
| 2008/0076453 | A1* | 3/2008 | Cai et al. ....................... 455/466 |

OTHER PUBLICATIONS

LERG Routing Guide, foster.stonedcoder.org/~i-ball/telecom/Telecom/lerg/LERGSPEC.doc.*

* cited by examiner

*Primary Examiner* — Charles Shedrick
(74) *Attorney, Agent, or Firm* — SNR Denton US LLP

(57) ABSTRACT

A computing system configured to receive an SMS message generated by a wireless device and include an indicia of an address, such as a telephone number, associated with a destination wireline device (e.g., telephone). The computing system may be configured to access a database located on a network and to store parameters defining type and usage of blocks of address identifiers (e.g., NPA-NXX block of telephone numbers). The computing system may further be configured to determine whether type and usage parameters associated with the destination wireline device are within a block of address identifiers defined to share communications between wireless and wireline networks. The computing system may further route the SMS message to the destination wireline device in response to determining that the type and usage parameters enable sharing between wireless and wireline networks.

21 Claims, 5 Drawing Sheets

SYSTEM AND METHOD FOR ENABLING SHORT MESSAGE SERVICES BETWEEN WIRELESS AND WIRELINE COMMUNICATION SYSTEMS

BACKGROUND OF THE INVENTION

Short message service (SMS) or text messaging is made available to mobile users as a peer-to-peer or peer-to-application message delivery service. Subscribers of any given cellular network can send SMS messages to a subscriber of any cellular network, in general, or to Internet Protocol (IP) applications under special agreements. For a mobile-oriented to wireline number destined SMS message, there is no guarantee that a short message service center (SMSC) of the originating wireless network will pass the message to an inter-carrier SMS gateway (ICSG) operator for further processing. The short message service center of the wireless network can drop the SMS message destined for a wireline telephone. In cases where the wireless carriers follow best efforts and forward these messages to the ICSG operator, the operator may drop the SMS message when it checks for a valid number for the destination address. Currently, inter-carrier SMS gateway operators do not have a destination identified for wireline numbers for terminating SMS messages.

FIG. 1 is an illustration of an exemplary telecommunications network 100 configured for conventional SMS message communications. As shown, there are three wireless networks, wireless network 102, wireless network 104, and wireless network 106. Wireless network 102 includes mobile switching centers 108a and 108b. To provide SMS messaging capabilities, a short message service center 110 is also included in the wireless network 102. As understood in the art, a home location register (HLR) 112 is included in the wireless network 102 to enable mobile switching centers 108 and short message service center 110 to look up address locations of mobile telephones 114a and 114b using mobile directory numbers (MDNS).

An SMS message or text message may be delivered from an origination mobile telephone 114a to a destination mobile telephone 114b by the user of the origination mobile telephone 114a preparing and sending an SMS message to a mobile directory number of the destination mobile telephone 114b in the form of data packets 116. The data packets 116 are communicated over a communication link 118 to mobile switching center 108a. The mobile switching center 108a determines that it has received an SMS message and communicates the message to the short message service center 110 via communication link 118b. In one embodiment, the communication link 118b utilizes a mobile application part (MAP) or IS-41 communications protocol to communicate between the MSC 108a and SMSC 110. The SMSC 110 looks up the location of the destination mobile telephone 114b in the home location register 112 of the destination mobile telephone 114b and communicates the SMS message to the MSC 108b serving the destination mobile telephone 114b. In the case of the destination mobile telephone 114b being turned off, the MSC 110 stores the SMS message and forwards the SMS message to a serving MSC when the destination mobile telephone 114b turns on at a later time.

If the destination address or mobile directory number is not recognized as a mobile directory number serviced by a wireless carrier that services the wireless network 102, then the SMS message is routed via a communications link 120 to an ICSG 122. In one embodiment, the communications link 120 utilizes a short message peer-to-peer protocol (SMPP). The ICSG 122 determines how to handle the SMS message by determining the SMS destination telephone number. Based on the SMS destination telephone number, the ICSG 122 determines the operating company number (OCN) of the wireless carrier serving the destination mobile telephone. If the destination telephone number is in a ported block, the ICSG 122 queries a local number portability (LNP) database 124 to determine the associated local routing number (LRN) and uses it to determine the OCN. If the OCN belongs to a carrier partner of the ICSG 122, then the message is appropriately routed via a communications link 126a to that carrier's SMSC 128. The SMSC 128 communicates the SMS message via communications link 126b to MSC 130. As understood, the MSC 130 queries the home location register 132 to determine the location of a destination mobile telephone 134 and communicates the SMS message over communications link 126c.

If the OCN does not belong to a carrier-partner of the ICSG 122, then the SMS message is communicated over communications link 135 to ICSG 136, which is a partner of the recipient's wireless carrier. The ICSG 136 determines the operating company and routes the SMS message to the OCN via a communications network 138a to the wireless carrier's SMSC 140 for further processing. The SMSC 140 stores the SMS message and notifies MSC 142 currently serving destination mobile telephone 146 that the SMS message is available. The MSC 142, in response to querying a home location register 144 serving the wireless network 106, downloads the SMS message and sends it to the destination mobile telephone 146 for display to the user via communications link 138c.

Communications of SMS messages between wireless networks, as provided above, operates fairly efficiently for a number of reasons. First, wireless carriers have agreements to share SMS messages between wireless networks. Second, wireless carriers use equipment that is configured to handle SMS messages in a common manner. Third, wireless devices that are in communication with wireless networks use the same communications standards that support SMS messages.

While wireless carriers have agreements and use communications equipment to seamlessly communicate SMS messages between mobile telephones and other wireless communications devices of subscribers among the different wireless networks, SMS message communications between wireless networks and wireline networks is generally not possible. FIG. 2 is an illustration of an exemplary conventional telecommunications network 200 including both a wireless carrier 202 and wireline carrier 204. To illustrate sending an SMS message from an origination mobile telephone 206 to a wireline telephone 208, a user of the origination mobile telephone 206 may send an SMS message to a telephone number of the wireline telephone 208. The mobile switching center 210 currently serving the mobile telephone 206 receives the SMS message and routes the SMS message to a short message service center 212. Because the SMS message is addressed to a mobile directory number not recognized by the wireless carrier 202, the SMSC 212 may either drop the SMS message or route it to the ICSG 214. Because SMS message communications are originator pay services, some wireless carriers choose to drop messages destined to non-wireless numbers. Interpreting a telephone number as being non-wireless is not well-defined. Typically, the telephone number to which the SMS message is destined is queried in a local exchange routing guide (LERG) (not shown, but typically located on a network (e.g., the Internet)), and determined as not being directed to a valid wireless telephone number. In the case of the SMS message being routed to the ICSG 214, the ICSG 214 determines the OCN associated with the destination telephone number, in this case the wireline carrier 204, so the ICSG 214 generally drops the SMS message as there is typically not an agreement between the wireless carrier 202 and wireline carrier 204 to communicate SMS message therebetween.

An alternative configuration that has been used is that the SMSC 212 determines that the SMS message is destined for a wireline telephone and converts the text message into a synthesized voice recording for communication to the wireline telephones. In response to the synthesized voice message being communicated to the wireline telephone, a text message is delivered to the origination mobile telephone 206 for notification that a synthesized voice message was delivered to the destination wireline telephone 208. However, the original intent of the user of the mobile telephone 206 is defeated in that the text message, in a text format, is not delivered to the wireline telephone 208.

SUMMARY OF THE INVENTION

To overcome the problem of text messages not able to be communicated between wireless networks and wireline networks, the principles of the present invention provide for wireline destination numbers to be viewed as wireless destination numbers. To enable wireline telephone numbers to be viewed as wireless telephone numbers, a database located on a network may be configured to designate a block of telephone numbers that provides for sharing of SMS messages between wireless and wireline networks.

One embodiment of a system for delivering SMS messages between wireless and wireline devices. The system may include a computing system configured to receive an SMS message generated by a wireless device and include an indicia of an address associated with a destination wireline device. The computing system may be configured to access a database located on a network and to store parameters defining type and usage of blocks of address identifiers. The computing system may further be configured to determine whether type and usage parameters associated with the destination wireline device are within a block of address identifiers defined to share communications between wireless and wireline networks. The computing system may further route the SMS message to the destination wireline device in response to determining that the type and usage parameters enable sharing between wireless and wireline networks.

Another embodiment may include a method for enabling short messaging services to be communicated between wireless and wireline devices. The method may include setting at least one parameter associated with a block of address identifiers in a database to enable communications with the block of address identifiers to be shared with at least wireless and wireline types of networks, and establishing a relationship with an ICSG operator to configure an OCN associated with a wireline carrier within a short message service center for routing SMS messages to a short message service center of a wireline carrier for delivery to subscribers within the block of address identifiers.

Yet another embodiment may include a system for communicating SMS messages to wireline subscribers of a wireline carrier. The system may include a computing system in communication with an inter-carrier short message service gateway and a public switched telephone network. The computing system may be configured to translate addresses of SMS messages for routing to wireline devices located on the public switched telephone network.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION OF THE DRAWINGS

There are a few solutions to enable SMS messages to be communicated between wireless and wireline networks. One solution is a contractual agreement between wireless carriers to route SMS messages sent to their line ranges to a particular location for further treatment. These contractual agreements would have to include all national and regional wireless carriers to deploy a nationwide "wireline-SMS" service. A second solution is for a wireline carrier to obtain a wireless OCN by fulfilling any of the following requirements, (i) securing spectrum in the desired regions, and (ii) establishing itself as a wireless reseller. The wireless number blocks obtained by the wireline carrier may then be modified to reflect 'shared' status between wireless and wireline by modifying the NXX Type stored in a database, such as a local exchange routing guide (LERG) database operated by Telcordia Technologies, Inc. However, this may require the wireline company to negotiate new inter-connect contracts with other wireline providers. Securing a wireless or wireless reseller OCN for the number blocks allows the wireline company to partner with an ICSG provider for SMS message routing for this number block With the OCN and number block information, the ICSG is in a position to negotiate with its peers for SMS message routing of this number block. Also, with this OCN assigned, filtering by wireless carriers for this number block can be avoided. While the two above solutions for enabling SMS message communications between wireless and wireline networks is possible, these solutions face challenges due to the wireless carriers having to negotiate contractual agreements or a wireless carrier having to secure an OCN, both of which may be difficult and time consuming.

Figure 1:
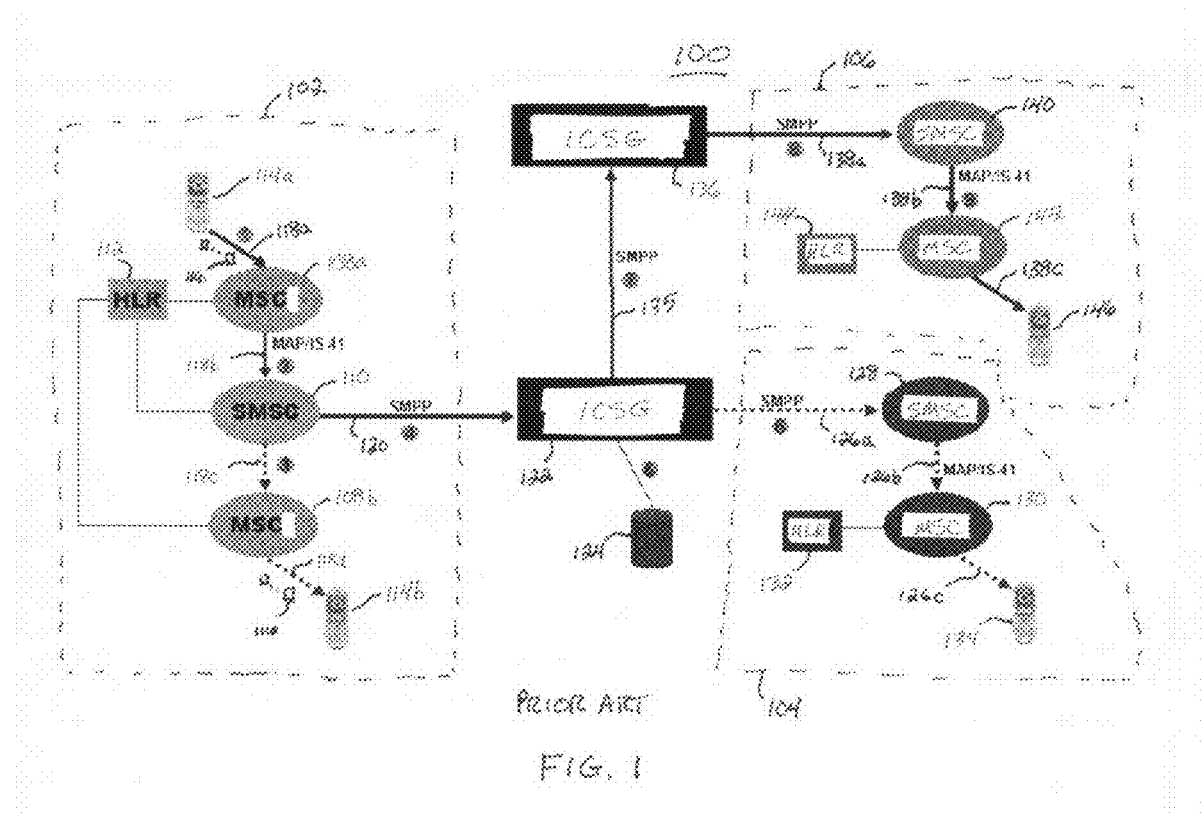
FIG. 1 is an illustration of an exemplary telecommunications network configured for conventional SMS message communications.
Figure 2:
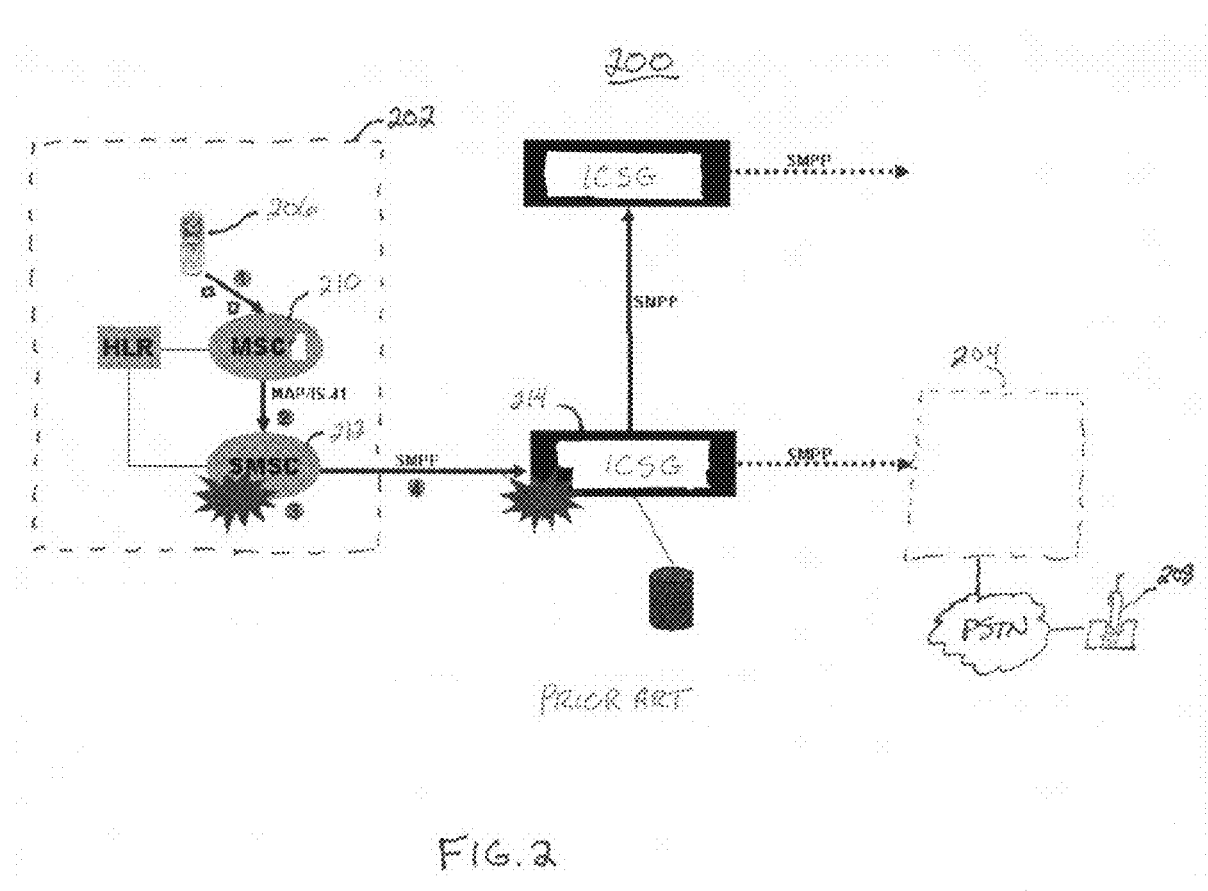
FIG. 2 is an illustration of an exemplary conventional telecommunications network including both a wireless carrier and wireline carrier.
Figure 3:
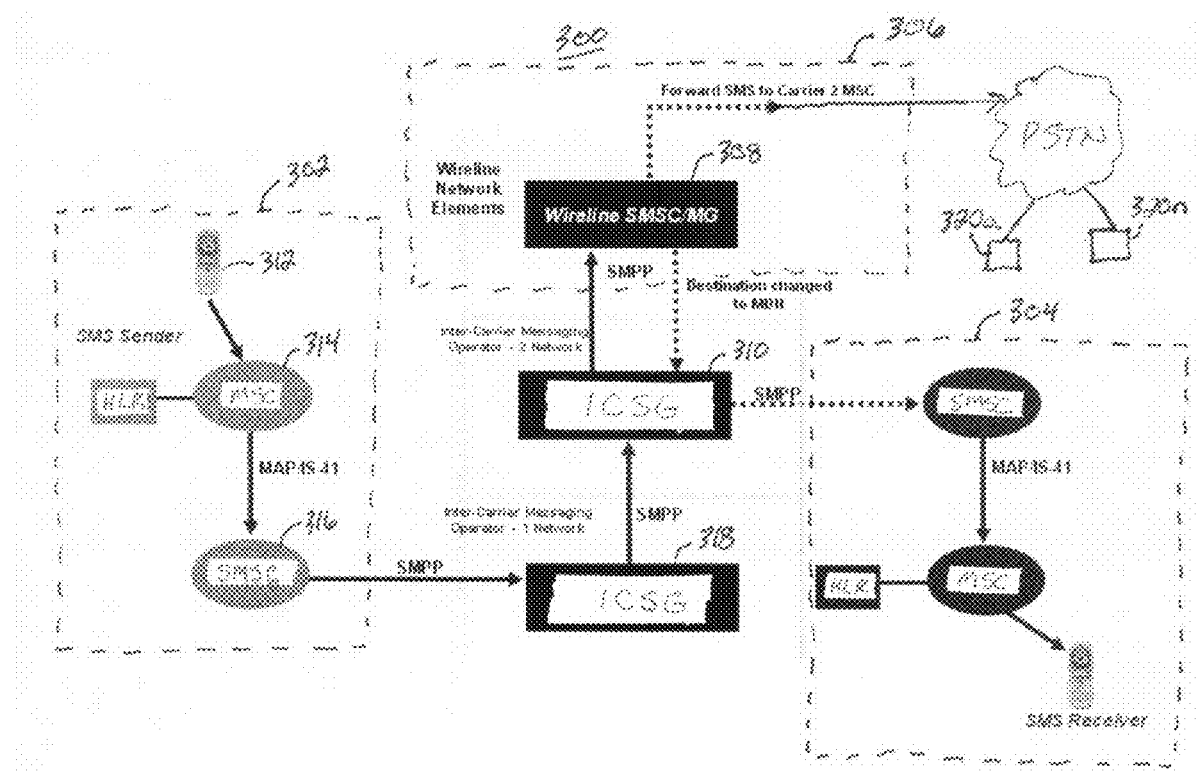
FIG. 3 is an illustration of an exemplary telecommunications network including wireless carriers and wireline carrier configured to enable SMS messages to be seamlessly communicated between the wireless carriers and wireline carrier.

Another solution to enable SMS messaging between wireless and wireline networks includes a wireline carrier establishing one or more parameters in a database, such as the LERG database, on a network that identifies blocks of telephone numbers as enabling SMS messages to be shared between wireless and wireline networks. Voice traffic is treated as being terminated to a wireline telephone and SMS messages are routed via the assigned wireline telephone number when the parameters are properly established. To employ this database modification solution, a short message service center/media gateway (SMSC/MG) may be included between a wireless network and a wireline network FIG. 3 is an illustration of an exemplary network 300 including wireless carriers 302 and 304 and wireline carrier 306 that enables SMS messages to be communicated between the wireless carriers 302 and 304 and wireline carrier 306. FIG. 3 shows a wireline SMSC/MG 308 being in communication with an ICSG 310. The wireline SMSC/MG 308 may use the short message peer-to-peer protocol to communicate with the ICSG 310. The wireline SMS/MG 308 is used to perform address translation for SMS routing to destination telephones, including wireless and wired telephones. While the wireline SMS/MG 308 platform may be managed by a wireline carrier 306, it should be understood that the functionality of the wireline SMSC/MG 308 may be incorporated into the ICSG 310 and managed by an operator thereof.

In addition to inclusion of a wireline SMS/MG 308 between a wireless and a wireline network, blocks of numbers that are desired to be wireline number enabled for SMS services within existing wireline OCNs of a wireline subscriber may be obtained. The LERG database may have one or more parameters altered for the block(s) of telephone numbers. For example, an NXX Type field may be set to a value of 50. The wireline carrier may modify parameters associated with either a complete NPA-NXX or a block of thousands numbers under that NPA-NXX. This change may be made by the LERG administrator of the wireline carrier and take a minimum of seven days before it comes into effect.

By way of background, the LERG database is operated by Telcordia Technologies, Inc. The LERG database stores the North American Numbering Plan (NANP) that governs the management of telephone number resources for the Public Switched Telephone Networks (PSTN) in North America, including Canada, the United States, the Caribbean, and territories, within the International Code '1'. The LERG database has data for every switch and central office in the North American telephone network In addition, the LERG database includes records of blocks of telephone numbers, including NPA-NXX blocks (ten-thousands blocks) and thousands blocks within each NPA-NXX block The LERG database may store tables including a number of parameters that are used for service providers to establish blocks of telephone numbers as particular types of telephone numbers having particular types of services. It should be understood that the principles of the present invention are not limited to the LERG database as any database located on a network accessible to routers located on the network may be utilized. It should further be understood that a block of address identifiers may include telephone numbers or other network addresses associated with telephones or other devices that may operate on a wireline network.

TABLE 1 below shows a few exemplary parameters that are stored in the LERG database that may be utilized in accordance with the principles of the present invention.

TABLE 1

NXX Type, COC Type & SSC Acceptable Mapping/Usage

| NXX TYPE | NXX TYPE DEFINITIONS | COC TYPE | SSC | ACCEPTABLE SSC COMBINATIONS |
|---|---|---|---|---|
| 00 | Regular (plain old telephone service POTS)) | EOC | I, J, M, N, O | I, J, JM, M, MO, N, O |
| 50 | Shared between three or more networks (POTS, cellular, paging, mobile, or miscellaneous) | EOC PMC-Type 2 RCC-Type 1 | B, C, J, R | BC, BCJ, BCJR, BCR, BJR, BR, CR |

As understood in the art, the parameters provided in TABLE 1 are a small subset of the parameters available for telecommunications carriers to use in defining blocks of telephone numbers. An NXX Type having a value of '50' limits the carrier to select a COC Type of either EOC, PMC-Type 2, or ROG Type-1. The NXX Type being '50' further limits the service provider to select four different SSC values (i.e., B, C, J, R) in combination (e.g., BC, BCJ, BCJR, BCR, BJR, BR, and CR). It should be understood that there are many other NXX Type values of which blocks of telephone numbers may be defined, but, these two (i.e., '00' and '50'), are useful in understanding the principles of the present invention. That is, in one embodiment, the principles of the present invention utilizes an NXX Type having a value of '50,' COC. Type value of 'EOC,' and SSC value of 'C'.

The COC Type of 'EOC' is defined as an end office code. The SSC or special service code, defines 'C' as meaning cellular services. The combination of COC Type/SSC of 'EOC' and 'C' defines the block of telephone lines to be shared wireline/cellular, thereby enabling SMS messages to be communicated between the wireless and wireline networks, thereby preventing wireless and wireline SMSC and ICSG systems from blocking SMS messages from being communicated to destination telephone numbers located on non-wireless networks.

In addition to the LERG parameters being configured to enable SMS messages to be communicated to wireline telephone numbers, relationships with ICSG operators to recognize the wireline OCNs and route the SMS messages destined for the wireline numbers to the desired SMS/MG 308 in the wireline carrier's network may be established. In other words, the ICSG 310 is to be configured to recognize the OCN of the wireline carrier 306 and communicates SMS messages destined for subscribers of the wireline carrier 306 via the wireline SMSC/MG 308.

With the LERG database having parameters associated with blocks of wireline telephone numbers to enable sharing of SMS messages between wireless and wireline networks, a process for an SMS message to be communicated from an origination wireless device 312 to a destination wireline telephone number may be as follows. A user of the wireless device 312 prepares and sends an SMS message to a destination wireline telephone number. The SMS message is received by MSC 314 that is currently serving the origination wireless device 312. The MSC 314 routes the SMS message to SMSC 316 for handling. When the SMSC 316 checks the network type of the destination telephone number, the NXX Type field is determined to be '50' in the LERG database (not shown), which indicates the telephone line to be shared between three or more types of networks (i.e., POTS, cellular, paging, mobile, or miscellaneous). The SMSC 316 forwards the message to ICSG 318 for further delivery without dropping the SMS message. The ICSG 318 determines that the destination number of the SMS message has an OCN of the wireline carrier 306. If the wireline carrier 306 has a relationship with the ICSG 318, the ISCG 318 recognizes the OCN and routes the SMS message to the SMSC/MG 308 via a communications link optionally configured to use SMPP for further routing. If the wireline carrier 306 does not have a relationship with the ICSG 318, then the ICSC 318 recognizes the NXX Type field in the LERG database and determines that the telephone number belongs to the 'shared' category. The ICSG 318 passes the MSM message to the ICSG 310 that has a business relationship with the wireline carrier 306. ICSG 310 recognizes the OCN and routes the SMS message to the wireline SMSC/MG 308 for further routing to a subscriber of the wireline carrier 306.

Figure 4:
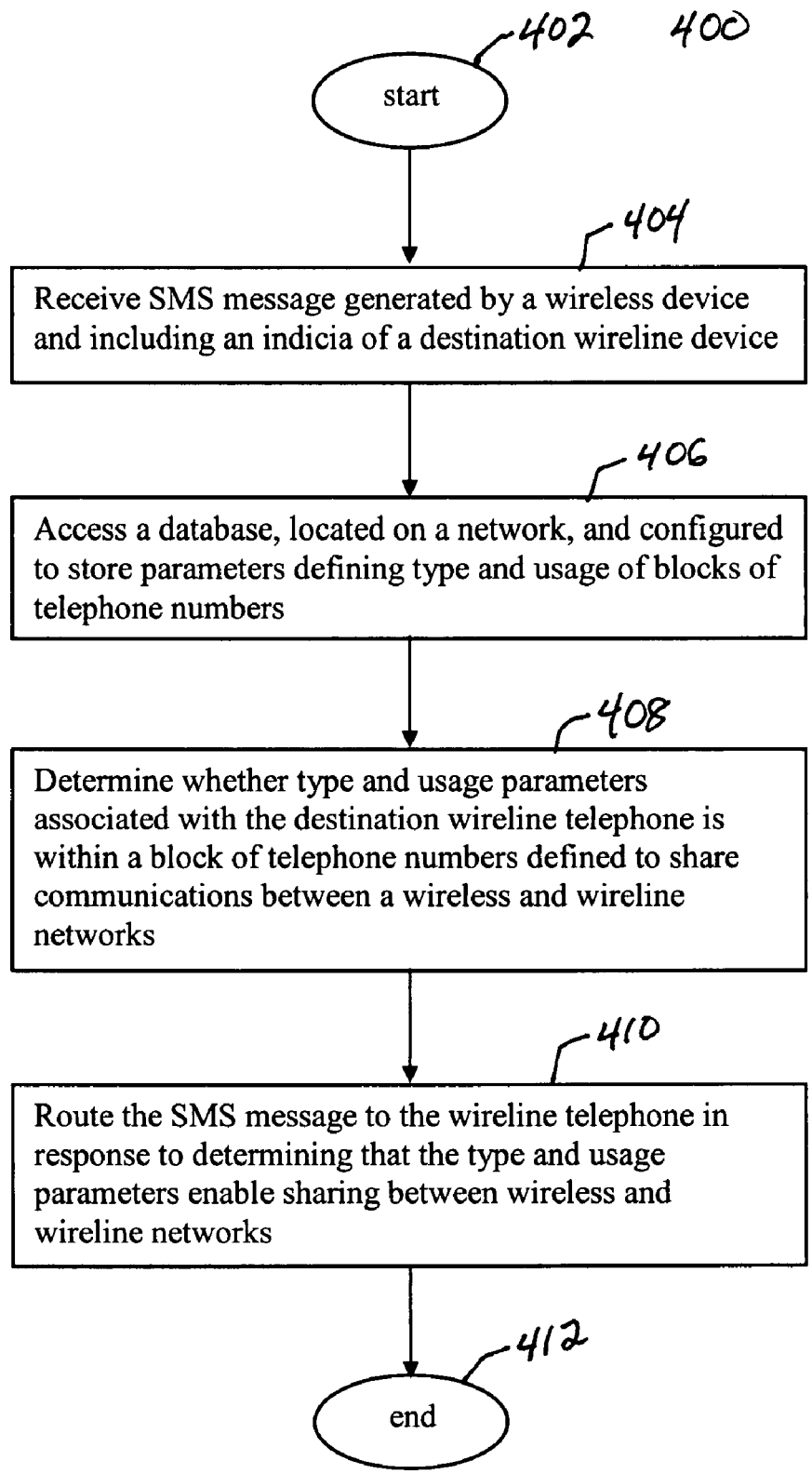
FIG. 4 is a flow chart of an exemplary process for an SMS message to be communicated from a wireless device to a wireline device.

FIG. 4 is a flow chart of an exemplary process for an SMS message to be communicated from a wireless device to a wireline device. The process 400 starts at step 402. At step 404, an SMS message generated by a wireless device including an indicia of a destination wireline device is received. The indicia of the destination wireline device may be a telephone number. At step 406, a database located on a network and configured to store parameters defined in type and usage of blocks of telephone numbers is accessed. The blocks of telephone numbers may be blocks of ten thousand, blocks of one thousand, or any other size of blocks of telephone numbers. At step 408, a determination as to whether type and usage parameters associated with the destination wireline telephone is within a block of telephone numbers defined to share communications between wireless and wireline networks. The SMS message is routed to the wireline telephone in response to determining that the type and usage parameters enable sharing between wireless and wireline networks except 410. The process 400 ends at step 412. In one embodiment, the process 400 is performed by an SMS/MG operated by a wireline carrier. Alternatively, the process 400 may be performed by an ICSG.

Figure 5:
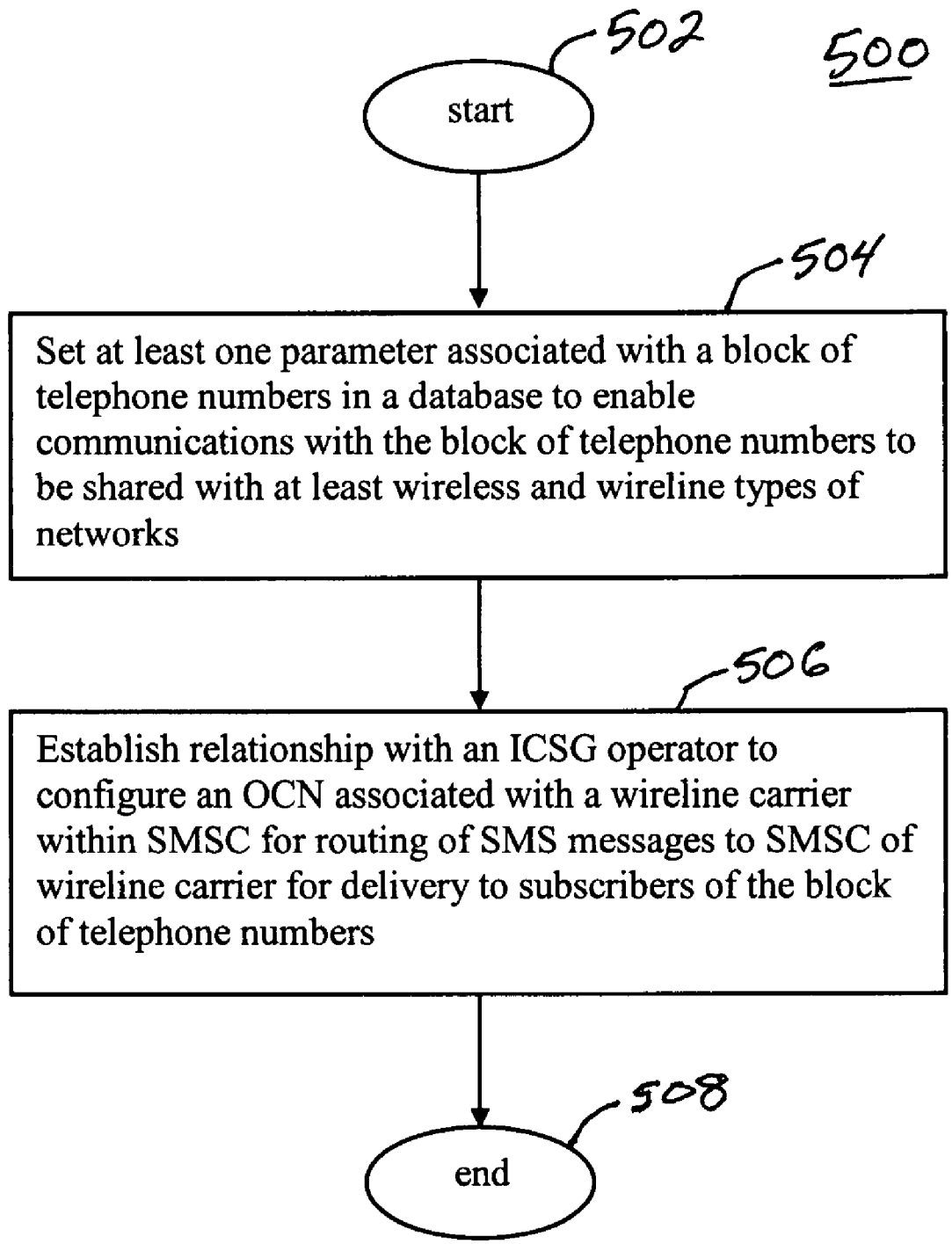
FIG. 5 is a flow chart of an exemplary process for enabling SMS messages to be communicated between wireless and wireline networks.

FIG. 5 is a flow chart of an exemplary process for enabling SMS messages to be communicated between wireless and wireline networks. The process 500 starts at step 502. At step 504, at least one parameter associated with a block of telephone numbers in a database is set to enable communications of the block of telephone numbers to be shared with at least wireless and wireline types of networks. At step 506, a relationship is established with an ICSG operator to configure an OCN associated with a wireline carrier within an ICSG for routing SMS messages to an SMSC of the wireline carrier for delivery to subscribers of the block of telephone numbers. The process 500 ends at step 508.

The previous detailed description is of a small number of embodiments for implementing the invention and is not intended to be limiting in scope. One of skill in this art will immediately envisage the methods and variations used to implement this invention in other areas than those described in detail. The following claims set forth a number of the embodiments of the invention disclosed with greater particularity.

We claim:

1. A system for delivering SMS messages between wireless and wireline devices, the system comprising:
a computing system configured to:
receive an SMS message generated by a wireless device and including a telephone number associated with a destination wireline device;
access a database, located on a network between wireless networks and wireline networks and accessible through a short message service center/media gateway (SMSC/MG) utilized to perform address translation for received SMS messages, the database being configured to store parameters defining type and usage of numbers blocks of telephone numbers;
look-up, in the database, a type parameter associated with a numbers block of telephone numbers in which a telephone number associated with the destination wireline device is located;
look-up, in the database, a usage parameter associated with the numbers block of telephone numbers in which the telephone number associated with the destination wireline device is located;
determine whether the combined type and usage parameters associated with the destination wireline device is within the numbers block of telephone numbers defined to share communications between the wireless and wireline networks; and
route the SMS message to the destination wireline device in response to determining that the combined type and usage parameters associated with the numbers block of telephone numbers in which the telephone number associated with the destination wireline device enable sharing between the wireless and wireline networks.

2. The system according to claim 1, wherein the SMS message is received by the SMSC/MG, wherein the SMSC/MG is incorporated into an inter-carrier SMS gateway (ICSG), wherein the database is the LERG database.

3. The system according to claim 1, wherein a first type parameter is an NXX Type parameter, wherein the NXX Type parameter is set to a specific value.

4. The system according to claim 3, further comprising:
determining whether a contractual agreement exists between a service provider of the wireless device and the wireline device; and
sending the SMS message for line ranges to a designated device for communicating the SMS message in response to the contractual agreement.

5. The system according to claim 3, wherein a second type of parameter is a central office code (COC) type parameter.

6. The system according to claim 5, wherein the second type parameter is set to an end office code (EOC).

7. The system according to claim 5, wherein a usage parameter is defined by a special service code (SSC).

8. The system according to claim 7, wherein the special service code includes a cellular services code.

9. A method for delivering SMS messages between wireless and wireline devices, said method comprising:
receiving an SMS message generated by a wireless device and including a telephone number associated with a destination wireline device;
routing the SMS message to a short message service center/media gateway (SMSC/MG) utilized to perform address translation for SMS messages;
accessing a database configured to store parameters defining type and usage of numbers blocks of telephone numbers in response to the message being received at the SMSC/MG;

looking-up, in the database, a type parameter associated with a numbers block of telephone numbers in which a telephone number associated with the destination wireline device is located;

looking-up, in the database, a usage parameter associated with the numbers block of telephone numbers in which the telephone number associated with the destination wireline device is located;

determining whether the combined type and usage parameters associated with the destination wireline device is within the numbers block of telephone numbers are defined to share communications between wireless and wireline networks; and routing the SMS message to the wireline device in response to determining that the combined type and usage parameters associated with the numbers block of telephone numbers in which the telephone number associated with the destination wireline device enable sharing between wireless and wireline networks.

10. The method according to claim 9, wherein accessing a database includes accessing the LERG database.

11. The method according to claim 9, wherein determining parameters includes determining whether an NXX Type parameter is set to a value of 50.

12. The method according to claim 11, includes determining whether a central office code type parameter is set to a value of an end office code.

13. The method according to claim 12, wherein determining includes determining whether a usage parameter is set to a special service code value of a wireless carrier.

14. A method for enabling short messaging services to be communicated between wireless and wireline devices, the method comprising:

setting at least one parameter associated with a numbers block of telephone numbers in a database to enable communications with the numbers block of telephone numbers to be shared with at least wireless and wireline types of networks, the parameters are enabled to include a type parameter and a usage parameter associated with the numbers block of telephone numbers;

establishing a relationship with an ICSG operator to configure an OCN associated with a wireline carrier within a short message service center for routing SMS messages to a short message service center of a wireline carrier for delivery to subscribers within the block of address identifiers, wherein the short message center includes a SMSC/MG utilized to perform address translation for the SMS messages, the SMS messages being routed through the SMSC/MG for delivery to the wireline devices enabled to receive the SMS messages;

determining whether a wireless carrier associated with a SMS message to be communicated has a relationship with the ISCG;

routing the SMS message to the SMSC/MG in response to determining there is the relationship between the wireless carrier associated with the SMS message and the ISCG; and routing the SMS message to a wireline device in response to determining that the parameters associated with the numbers block of telephone numbers associated with the wireline device are defined to enable sharing between the wireless and the wireline networks.

15. The method according to claim 14, further comprising:

recognizing the at least one parameter to determine whether a telephone of a destination device is configured to share communications with the wireless and wireline types of networks in response to determining there is not the relationship between the wireless carrier associated with the SMS message and the ISCG, wherein setting the at least one parameter in a database includes setting the at least one parameter in the LERG database.

16. The method according to claim 14, wherein setting the at least one parameters includes setting an NXX Type parameter to a value of 50.

17. The method according to claim 16, wherein setting at least one parameter further includes setting a central office code type to an end office code value.

18. The method according to claim 17, wherein setting at least one parameter further includes setting a special service code to a value of 'C'.

19. A system for communicating SMS messages to wireline subscribers of a wireline carrier, said system comprising:

a SMSC/MG in communication with an inter-carrier short message service gateway and a public switched telephone network, said SMSC/MG configured to receive SMS messages, access a database configured to store parameters defining type and usage of numbers blocks of telephone numbers from the SMSC/MG between wireless networks and wireline networks, determine whether a combination of type and usage parameters associated with the destination wireline device is within a numbers block of telephone numbers are defined to share communications between the wireless networks and wireline networks, and translate addresses of the SMS messages for routing to wireline devices located on the public switched telephone network.

20. The system according to claim 19, wherein the SMSC/MG is incorporated into an inter-carrier SMS gateway (ICSG).

21. The system according to claim 19, wherein said SMSC/MG is configured to communicate over a short message peer-to-peer protocol with the ICSG.

\* \* \* \* \*